US011966956B2

(12) United States Patent
Ginsberg et al.

(10) Patent No.: US 11,966,956 B2
(45) Date of Patent: Apr. 23, 2024

(54) MEASURING GREENHOUSE GAS EMITTING ACTIVITIES OF A USER

(71) Applicant: Discovery Limited, Sandton (ZA)

(72) Inventors: Dan Jonathan Ginsberg, Sandton (ZA); Lezette Carina Pienaar, Sandton (ZA); Andre Nepgen, Sandton (ZA)

(73) Assignee: Discovery Limited, Sandton (ZA)

( * ) Notice: Subject to any disclaimer, the term of this patent is extended or adjusted under 35 U.S.C. 154(b) by 121 days.

(21) Appl. No.: 17/505,766

(22) Filed: Oct. 20, 2021

(65) Prior Publication Data

US 2022/0122135 A1 Apr. 21, 2022

(30) Foreign Application Priority Data

Oct. 20, 2020 (ZA) ................................ 2020/06495

(51) Int. Cl.
*G06Q 30/04* (2012.01)
*G06Q 50/06* (2012.01)

(52) U.S. Cl.
CPC ............. *G06Q 30/04* (2013.01); *G06Q 50/06* (2013.01)

(58) Field of Classification Search
CPC ............................... G06Q 30/04; G06Q 50/06
USPC .............................................................. 702/2
See application file for complete search history.

(56) References Cited

U.S. PATENT DOCUMENTS 7,930,144 B2 4/2011 McConnell et al.
10,902,484 B1 * 1/2021 Pepere ................ G06Q 20/145
2007/0255457 A1 11/2007 Whitcomb et al.
2011/0137574 A1 * 6/2011 Koch .................... G06Q 10/10 702/24
2011/0184784 A1 7/2011 Rudow
2011/0208621 A1 8/2011 Feierstein et al.
2011/0213690 A1 9/2011 Ghosh et al.
2013/0085802 A1 4/2013 Belady et al.
2013/0246133 A1 * 9/2013 Dembo .................. G06Q 10/30 705/14.1
2013/0338936 A1 * 12/2013 Hong .................... G06Q 10/04 702/24
2020/0273047 A1 8/2020 Bridge et al.
2021/0216978 A1 * 7/2021 Diaz .................... G06Q 20/123

OTHER PUBLICATIONS

International Search Report for PCT/IB2021/059668; dated Nov. 29, 2021.

David Andersson,"A novel approach to calculate individuals' carbon footprints using financial transaction data—App development and design", Journal of Cleaner Production, vol. 256, May 20, 2020.

(Continued)

*Primary Examiner* — Ricky Go

(74) *Attorney, Agent, or Firm* — Fleit Intellectual Property Law; Paul D. Bianco; Jon Gibbons

(57) ABSTRACT

A system and method for measuring the greenhouse gas emitting activities of a user is described. Data for different sources of greenhouse gas emitting user activities, including electricity usage, motor vehicle usage, food consumption, and flight usage, are gathered, normalized, weighted, and presented. The system and method include providing the user with feedback regarding these activities and rewarding the user for changing these activities to thereby reduce their greenhouse gas emissions.

19 Claims, 6 Drawing Sheets

(56) References Cited

OTHER PUBLICATIONS

Sara Kitchens, Timothy Swavely, Dr. Elizabeth A. Albright, "Use of Carbon Footprint Monitoring Application to Modify Human Behavior", master thesis, Duke University, Aug. 22, 2017.
EP Search Report and Search Opinion for European App. No. EP21203765; dated Mar. 3, 2022, 7 pages.

* cited by examiner

Fig. 5

| Source of Greenhouse Gas | How Data is Derived | Data Conversion Considerations | Relative Weighting of Activity | Presentation to User Based on Goals |
|---|---|---|---|---|
| Vehicle | API, Dedicated Transponder/Telematics, Smartphone App (GPS, Camera) | Type of Vehicle, Miles Driven, Length of Time Operated | Normalize Data to Present As Part of Graph | Plot Normalized Portion as Part of Circular Graph with Goals |
| Airline | API, Scrape Emails or Webpages, Smartphone App (GPS, Camera) | Type of Airplane, Miles Flown, Time Operated | Normalize Data to Present As Part of Graph | Plot Normalized Portion as Part of Circular Graph with Goals |
| Food | API, Scrape Emails or Webpages, Smartphone App (GPS, Camera) | Type of Food, Where Food is Sourced, Where Food is Purchased (Store/Restaurant) | Normalize Data to Present As Part of Graph | Plot Normalized Portion as Part of Circular Graph with Goals |
| Electricity | API, Electricity Usage Measuring Device, Scrape Emails or Webpages, Smartphone App (Camera) | Amount of Electricity Consumed, Time of Day When Consumed, How Electricity is Generated (Coal, Natural Gas, Renewables, Nuclear) | Normalize Data to Present As Part of Graph | Plot Normalized Portion as Part of Circular Graph with Goals |

Fig. 6

MEASURING GREENHOUSE GAS EMITTING ACTIVITIES OF A USER

CROSS REFERENCE TO RELATED APPLICATIONS

This application claims priority to South African Provisional Patent Application Number 2020/06495, filed on Oct. 20, 2020, entitled "A Computer Implemented System and Method of Measuring Greenhouse Gas Emitting Activities of a User" the teaching of which is hereby incorporated by reference in its entirety.

BACKGROUND OF THE INVENTION

The present application relates to a computer implemented system and method of measuring greenhouse gas emitting activities of a user and reporting these to the user thereby to encourage the user to change their behaviours to reduce their personal emissions.

It has been found that 85% of an individual's greenhouse gas emissions relate to a small number of activities, namely their electricity consumption, their emissions from driving a private vehicle, emissions from all grocery purchases as well as food consumed from external sources (canteens/restaurants) and emissions from flights travelled by the individual.

The present invention aims to measure these greenhouse gas emitting activities of a user and incentivise them to reduce their personal emissions.

SUMMARY OF THE INVENTION

According to a one example embodiment, there is provided a computer-implemented system and method for measuring greenhouse gas emitting activities of a user, the system including:

- a memory for storing data that lead to greenhouse gas emission;
- a communications module for receiving data for each of a plurality of users relating to at least two of
  - electricity usage data wherein the electricity usage data is received from one or more of a utility company, extracted from a received utility bill of the user, extracted from an email or website and received from an electricity usage measuring device installed at the user's residence;
  - motor vehicle usage data, wherein the motor vehicle usage data is received from one or more of a telematics tag connected to a motor vehicle driven by the user and from the user's mobile telephone;
  - food consumption data, wherein food consumption data is received from one or more of a point-of-sale system, extracted from an email or website from a financial institution system and extracted from a received food purchase invoices of the user; and
  - flight usage data, wherein flight usage data is received from one or more of an airline system, from the user's mobile telephone, extracted from an email or website, or extracted from a received digital flight ticket;
- a processor operably coupled to the memory and communications module, the processor programmed to:
  - access the memory and retrieve the data relating to the at least two of electricity usage data, motor vehicle usage data, food consumption data and flight usage data;

- process at least two of the electricity usage data, motor vehicle usage data, food consumption data and flight usage data to calculate a Carbon Dioxide Equivalents (CO2e) value for at least two of the activity areas of electricity usage, motor vehicle usage, food consumption and flight usage; and
  - use the calculated CO2e values to generate display data to be transmitted to a user device for display to the user on the user device, the display including a representation of the calculated CO2e value for at least two of the electricity usage data, motor vehicle usage data, food consumption data and flight usage data.

The processor may be further programmed to analyse the usage data for each user to identify improvement areas where the user's activities could be improved to reduce the user's greenhouse gas emission. For example, the identified improvement areas are transmitted to the user device for display to the user on the user device.

The communications module may periodically receive further usage data relating to the plurality of activities that lead to greenhouse gas emission for each of the plurality of users and stores the further usage data in the memory, and wherein the processor is further programmed to analyse the stored usage data and further usage data and to calculate if the user has improved their activities to reduce their greenhouse gas emission.

In another example, the processor may be programmed to calculate that the user has improved their activities to reduce their greenhouse gas emission then the processor calculates a reward for the user.

In still another example, the processor may be further be programmed to convert at least two of the electricity usage data, motor vehicle usage data, food consumption data, and flight usage data into a normalized format, prior to the process at least two of the electricity usage data, motor vehicle usage data, food consumption data and flight usage data to calculate the CO2e value.

In another example, the processor may be further programmed to apply weights to each of at least two of the electricity usage data, motor vehicle usage data, food consumption data, and flight usage prior to the process at least two of the electricity usage data, motor vehicle usage data, food consumption data and flight usage data to calculate the CO2e value.

In yet, another example, the processor may be further programmed to overlay desired goals on the display, including representing the calculated CO2e value for at least two of the electricity usage data, motor vehicle usage data, food consumption data, and flight usage data.

BRIEF DESCRIPTION OF THE DRAWINGS

FIG. 5 shows an example of a user display to be displayed to the user via a mobile communication device; and.

FIG. 6 shows an example of a high-level table illustrating how sources of greenhouse gases are used.

DESCRIPTION OF THE EMBODIMENTS

Figure 1:
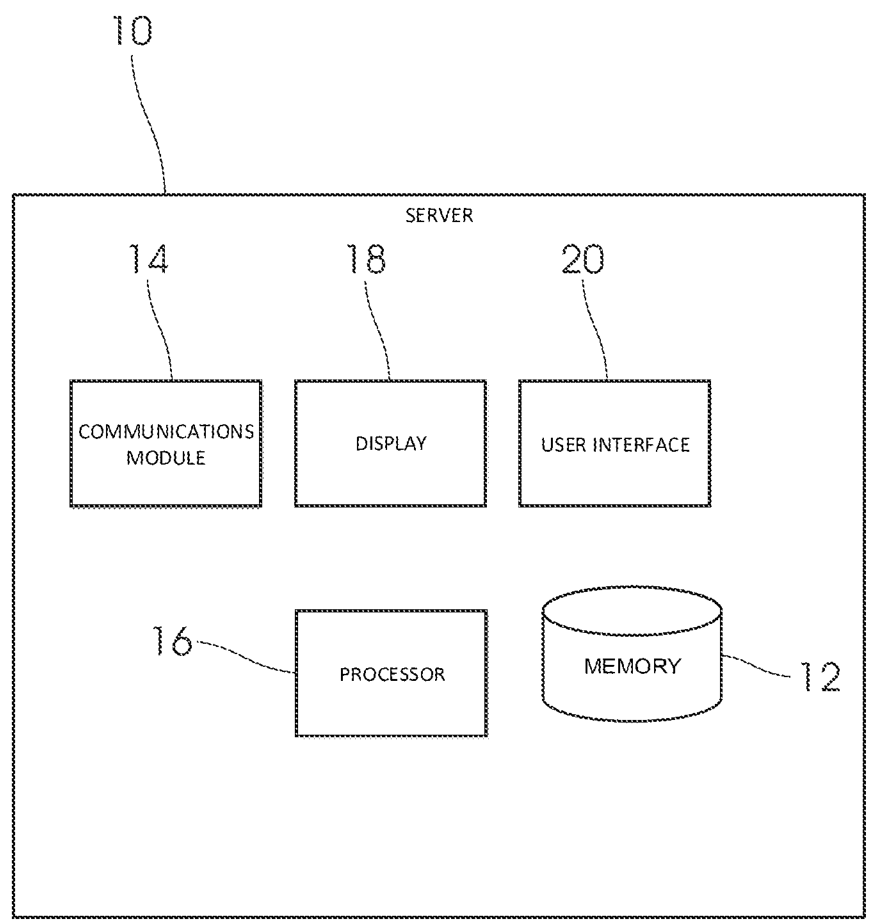
FIG. 1 is a block diagram illustrating an example server to implement the methodologies described herein.

The systems and methodology described herein relate to measuring greenhouse gas emitting activities of a user, providing the user with feedback regarding these activities and rewarding the user for changing these activities to thereby reduce their greenhouse gas emissions.

By way of background, the system described below measures greenhouse gases (GHG) which includes $CO_2$, methane, nitrous oxide etc. A unit of measurement is required in order to measure the impact of emitting the various gases, as for example a kilogram of methane causes a worse greenhouse effect than a kilogram of $CO_2$. As $CO_2$ is the most well-known/largest contributor, the GHG emissions measures are what are called Carbon Dioxide Equivalents which are denoted as CO2e, i.e., 1 kg Co2e is the GHG impact as would be felt from 1 kg of $CO_2$ being emitted. Thus, CO2e is a standard unit of measure.

In general, the system implements a Carbon Calculator which calculates personalised greenhouse gas emissions by tracking greenhouse-gas emitting activities including electricity usage, driving, food purchases and flights.

Using a proprietary methodology consisting of data analytics and CO2e coefficients to calculate the relative weighing of these various activities in calculating an overall carbon intensity score, the system provides personalised education for reducing emissions within a stipulated time frame.

The methodology integrates data collected from user records which allows for calculation of the emission quanta as per the coefficients. This includes electricity usage from electrical consumption meters; vehicle fuel consumption derived from telematic data, as well as vehicle production emissions from registered vehicles in use; emissions from food consumption derived from grocery purchase data; and emissions from flights derived from flight data. Where a gap in data is present, the user is prompted to fill-in an online questionnaire to complete the emissions calculations. Furthermore, the user is prompted to answer certain questions to determine an estimate of emissions apart from the four main categories, for completeness.

In order to achieve this the system will need to obtain data from a plurality of different data sources in different formats and process the data to determine the standard unit of measure.

Where possible, the system uses localised coefficients which pertain to the client's geography. Examples of this include emissions for food which will depend on the way the food itself is prepared or presented, as well as the country from where it is bought.

Another example would be the coefficient for fuel consumption which will vary by geography due to the emissions required to transport the fuel to a filling station, as well as the emissions required to produce the fuel itself, which may differ from location to location. Furthermore, the carbon coefficient for electricity consumption will vary by geography, due to the varying forms of electricity production in existence.

In this specific example, because inland provinces have a higher proportion of fuel in them which is derived from a coal-to-oil process, the petrol is so to speak dirtier, as more GHG emissions are associated with its production and use. Thus, when the system calculates 1 litre of fuel being used in Gauteng, this will yield a higher CO2e than 1 litre of fuel being used in Cape Town and/or the Western Cape.

Referring to the accompanying Figures, a computer-implemented system for measuring greenhouse gas emitting activities of a user includes a server 10.

The server 10 includes a memory 12 for storing data.

A communications module 14 is used for receiving usage data relating to a plurality of activities that lead to greenhouse gas emission for each of a plurality of users. The received usage data is stored in the memory 12. This will be described in more detail below.

A processor 16 is operably coupled to the memory 12 and communications module 14.

The server 10 also includes a display 18 for displaying information to a user and a user interface 20 through which a user can input information or instructions into the server 10.

In use, the processor 16 controls the server 10 to access the memory 12 and retrieve the usage data relating to the plurality of activities, process the usage data from the plurality of activities for each user and generate display data to be transmitted to a user device for display to the user on the user device.

The plurality of activities includes two or more of electricity usage, motor vehicle transport, food consumption and flying.

Data received at the server 10 will include two or more of electricity usage data, motor vehicle usage data, food consumption data and flight usage data. These will be described in more detail below.

The above will be described in more detail below.

Figure 2:
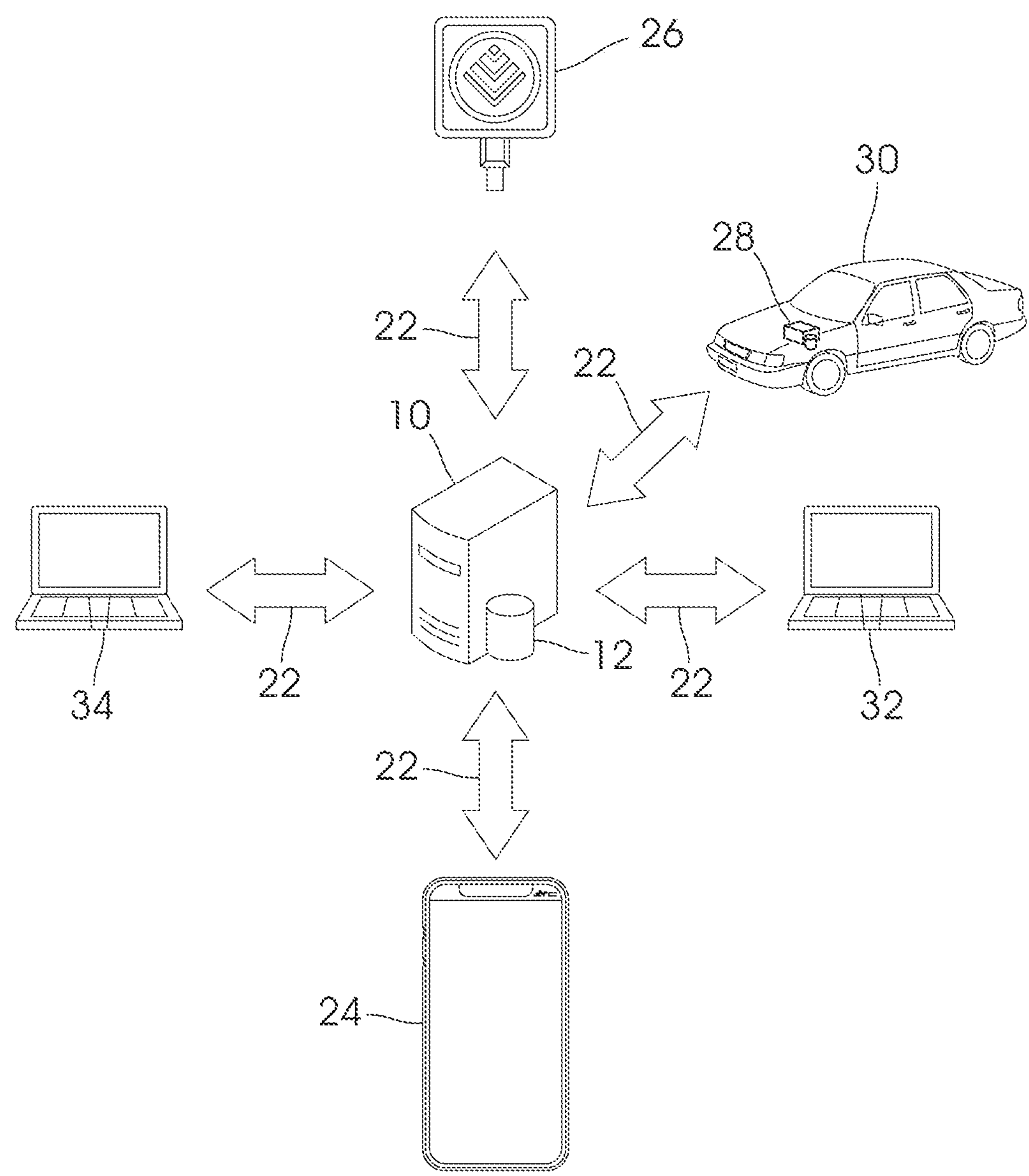
FIG. 2 shows an example system of the present invention.

Referring to FIG. 2, the server 10 is connected to a number of different devices and systems via one or more communications networks 22.

A user device 24 typically takes the form of a mobile telephone as illustrated, but could take the form of a tablet mobile computing device or a computer to name some other examples.

Referring now to FIG. 6, the figure shows an example of a high-level table illustrating how sources of greenhouse gases are used. Shown are five columns with four rows. Each row represents a source of greenhouse gas emitting activities from "Vehicle", "Airline", "Food", and "Electricity." Each of these sources of greenhouse gas emitting activities is further described below with reference to FIG. 3 through FIG. 4.

The second column of FIG. 6 describes how data may be derived for each source of greenhouse gas emission. For example, data can be derived for an airline on row 2 by any combination of API (application programming interface) to an airline reservation system, scraping emails, websites, and apps including reservation systems for information on the type of aircraft, duration of the flight, using an app on a smartphone including GPS and camera.

The third column of FIG. 6 gives examples of how the data is converted to calculate greenhouse emission activity into a standardized format. The fourth column of FIG. 6 illustrates the relative weighting of the data for each source of greenhouse emission activity. The weights can be due to the type of emissions, the time of emissions, the geography where the emission occurred, the weather during the emissions, type of fuel used to create the emission, the type of plane or motor vehicle that produced the emission, incentives in place to reduce certain sources of emissions, the number of people in a group or family producing the greenhouse gas emission activity, and other factors.

In the fifth column of FIG. 6, details of how the information that has been gathered, converted, weighted is presented to the user. This is illustrated and described further below with reference to FIG. 5. In another embodiment, FIG. 5 may also include desired goals overlayed for each source of greenhouse gas emission. In yet another embodiment, areas of improvement where the user's activities could be improved to reduce greenhouse gas emission are also displayed.

Figure 3:
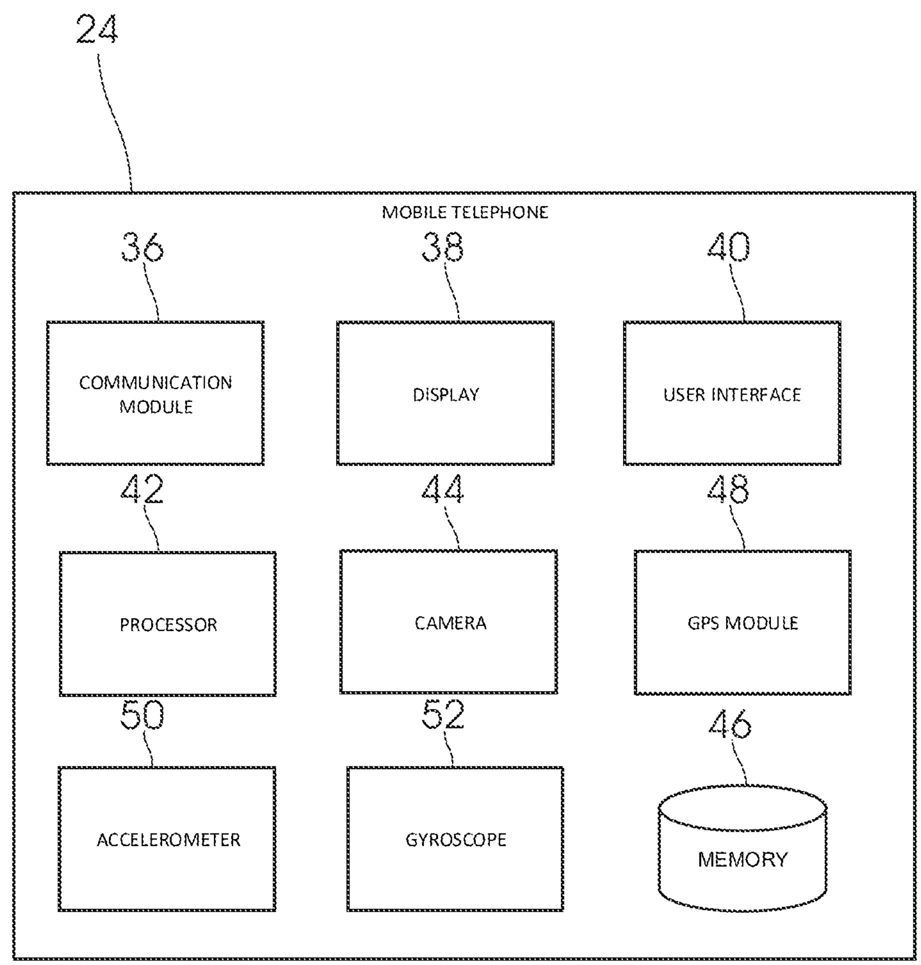
FIG. 3 shows an example mobile computing device for use with the present invention.

Turning to FIG. 3, this illustrates one example embodiment of a user device 24. In this illustrative example, the user device 24 is a mobile telephone.

The mobile telephone 24 includes a communication module 36 which is used for transmitting and receiving data to and from the mobile telephone 24.

The communication module 36 of a mobile telephone typically includes short-range communication ability and long-range communication ability.

The short-range communication ability could be Bluetooth, for example, by means of which the mobile telephone 24 can communicate with other devices in relatively near proximity to the mobile telephone 24.

The long-range communication ability could be, for example, to transmit data over a communications network.

The communication network may be a Public Services Telecommunications Network (PSTN), a Private Network, a Virtual Private Network (VPN), an Intelligent Network (IN) or Converged Network for example, or may be a combination of one or more of these network types.

The mobile telephone 24 may also include a display 38 by means of which information can be displayed to a user of the device and a user interface 40 by means of which a user can input data and instructions into the device.

An example of a user interface 40 is a touchscreen which is often included in modern smartphones together with one or more buttons and/or switches also typically included in modern smartphones.

The mobile telephone 24 includes a camera 44 which is used for capturing images.

The mobile telephone 24 also includes an on-board memory 46.

A processor 42 is connected to the memory 46, communication module 36, display 38, user interface 40 and camera 44.

A location module in the form of GPS module 48 determines the location of the mobile telephone 24 at any given time using the global positioning system. It will be appreciated that tracking the movement of the mobile telephone 24 when it is located in the vehicle of a user effectively determines the distance travelled by the vehicle.

An accelerometer 50 is used to detect the movement of the mobile telephone 24 and thereby movement of a vehicle in which the mobile telephone 24 is placed.

Gyroscope 52 determines the orientation of the mobile telephone 24.

The processor 42 has software executing thereon and the processor 42 controls the operation of the mobile telephone 24.

Referring back to FIGS. 1 and 2, electricity usage data is received at the server 10 for example from one or more of a utility company, extracted from a received utility bill of the user and received from an electricity usage measuring device 26 installed at the user's residence.

In one example, the electricity usage data includes a Kilowatt-hour (kWh) measurement.

A user identification is stored in the memory 12 and linked to one or more of the data received from the utility company, utility bill and electricity usage measuring device 26 so that the obtained electricity usage data can be stored in the memory 12 and associated with the user identification.

Where the electricity data is obtained from the utility company, this is achieved by the server 10 receiving electricity data, via the communications module 14, from a server of the utility company.

This can be achieved in a number of ways. For example, the electricity data can be pushed from the utility company to the server 10 periodically. Alternatively, or in addition, the server 10 can access the electricity data from the utility company by way of an application programming interface (API).

Where the electricity data is obtained from a utility bill of the user, a digital electricity bill of the user is received at the server 10 via the communications module.

Software executing on the processor 16 parses the electricity bill to extract the required electricity data.

Where the electricity date is obtained from an electricity usage measuring device 26, the server 10 is connected to the electricity usage measuring device 26 connected to an electrical system at the user's residence to monitor the user's electricity usage. Electricity usage data for the activity of electricity usage is then received by the communication module 14, which electricity usage data has been transmitted from the electricity usage measuring device 26 to the server 10.

In an alternative embodiment, the electricity usage data may be transmitted indirectly to the server 10 in which case the electricity usage measuring device 26 is connected to a different system that receives the data and in turn transmits the data to the server 10.

In either case, the device 26 is typically connected to the user's electricity distribution board at the user's home. The electricity distribution board is connected to the mains power supply and is the input point for mains electricity to be supplied from the public power distribution network.

Thus, the electricity usage measuring device 26 is able to measure all electricity consumption for the user and their family if they do not stay alone.

The measured electricity consumption forms part of the electricity usage data which is transmitted from the electricity usage measuring device 26 via communication network 22 to the server 10 and stored in the memory 12.

This communication could take any suitable form and may be for example over a cellular communications network or via the Internet for example using the Internet of Things.

The electricity usage measuring device 26 will typically include an on board memory and a communications module.

The usage readings may be stored in the memory and transmitted periodically to the server 10 or alternatively may be transmitted live to the server 10.

Figure 4:
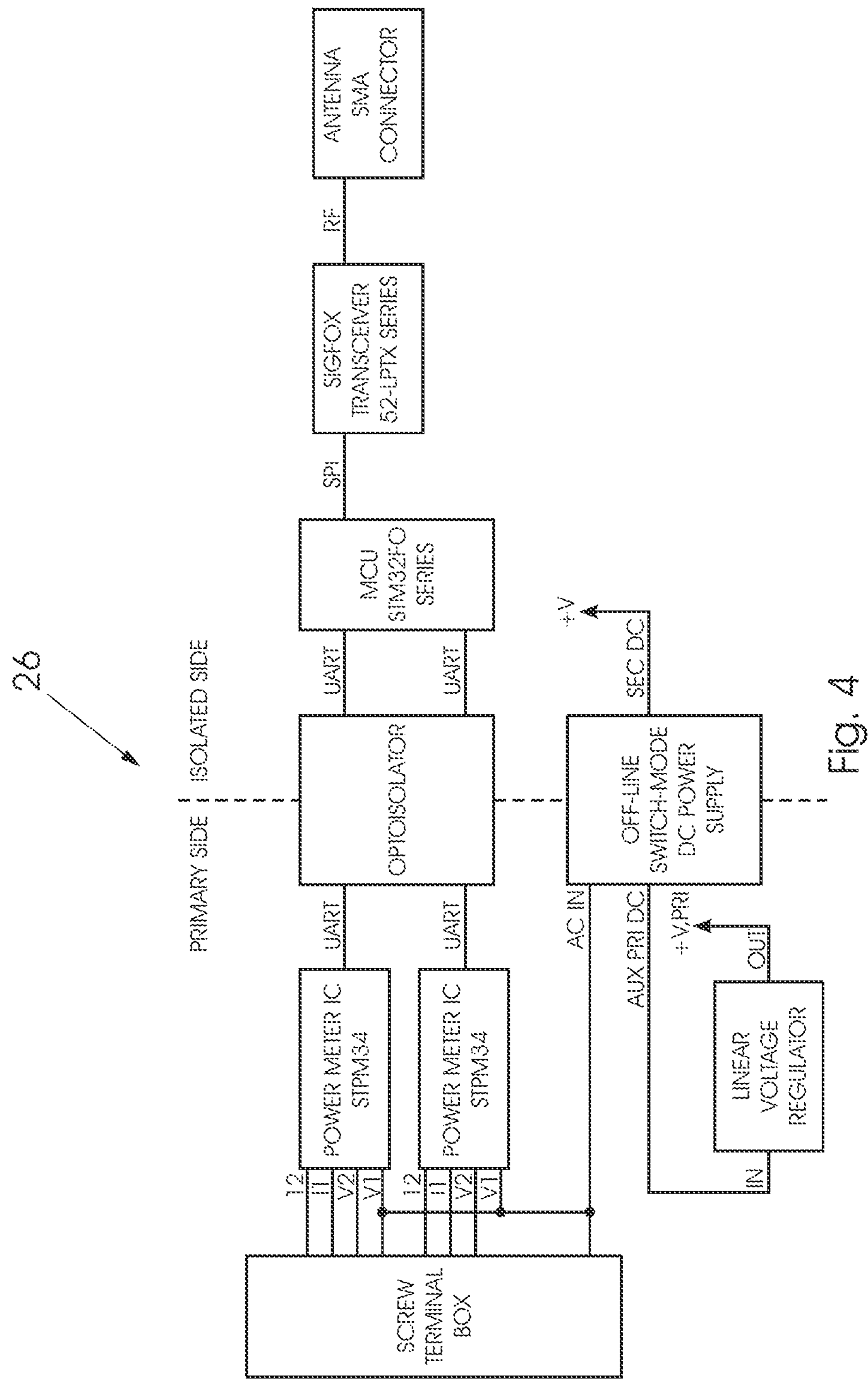
FIG. 4 shows an example embodiment of the electricity usage measuring device from FIG. 2 in more detail.

FIG. 4 shows an example embodiment of an electricity usage measuring device 26.

The electricity usage measuring device 26 is housed in a two-part injection-moulded plastic housing, with a DIN rail mounting clip on the back. It is designed for installation inside an electrical distribution board. It has a set of screw terminals which sit behind the distribution board cover, and an antenna connector which is in front of the distribution board cover, but behind the door.

The electronics are divided into two galvanically isolated zones, called the primary side and the isolated side.

Electrical connections to line voltage, and to the current transformers, are made on the primary side. Electrical connections to the external antenna cable are made on the isolated side.

The incoming AC lines from the terminal block are protected by non-replaceable PCB-mount fuses and metal-oxide-varistor surge suppressors.

An off-line switch-mode power supply provides regulated DC power on both the primary side and on the isolated side.

Two STPM34 power meter IC's monitor up to two voltage waveforms and two power waveforms each, and compute power consumption.

The main microcontroller of the prototype is an STM32 series part with an ARM Cortex-MO core. It is on the isolated side, and communicates with the STPM34 power meters via two opto-isolated UART connections.

A S2-LPTX SigFox transceiver is used to transmit power consumption data on an 868 MHz frequency band to the SigFox network. The microcontroller connects to it via an SPI link.

An SMA connector is mounted on the front panel of the device for connection of the antenna.

The device 26 messages every 10 minutes by default but the number of minutes between messages can be altered in response to a SigFox command.

The device 26 monitors voltage and current and computes power.

The device 26 uses an external current transformer to monitor each load

Once the electricity usage data is obtained, the system 10 needs to process this data to obtain a standardized value of the effective greenhouse gas emissions from this. This will be described in more detail below.

The electricity usage measuring device 26 is used to measure daily electricity consumption, with data transmitted every 10 minutes or every 30 minutes for example.

This will be used to calculate a weekly or monthly electricity saving goal enabled by energy-efficient technology installation and/or behavioural changes.

The user will be able to track their consumption on a near real-time basis as the usage data is collated and transmitted to their mobile telephone 24 for display. The user is also given a weekly consumption goal which is based on their historic consumption, adjusted for seasonality, and is expressed as a KWH allowance for the week.

The installation of the electricity tracker is done by trained technicians who are also able to conduct minor technology upgrades that generate considerable electricity savings. Examples of these include replacing the household lights with energy saving lights, such as LEDs, installation of insulating materials around the geyser (water boiler), pipes, walls and ceilings, as well as installing systems which can smartly control the activity of the geyser (water boiler) to reduce and/or shift usage.

The technician can also do an initial energy audit when installing the device to ascertain what electricity using appliances and devices are on site. Further information in this regard can be obtained from the home owner completing an on-line questionnaire which will provide further information for the system to use when advising the home owner on changes they can make to reduce their electricity usage.

It will be appreciated that at times there are more than one person residing at the user's house. In one example the server 10 obtains data from another system to determine this. For example, the server 10 may obtain data from a related health insurer system which data includes that the user a health insurance policy with 3 other people (the user's dependents), of ages x, y and z. Thus the server 10 can attribute a specific portion of the emissions from electricity in the house to the user.

In one example, this is done in proportion to age. So for example 2 adults would get a 50/50 split, but if a child were added, a small child (up to age 12) would get 20% of the share on electricity.

Motor vehicle usage data is obtained for example from one or more of a telematics tag 28 connected to a motor vehicle 30 driven by the user and from the user's mobile telephone 24.

Where the motor vehicle usage data is obtained from telematics tag 28, the server 10 is connected to a telematics tag 28 connected to a motor vehicle 30 driven by the user. The motor vehicle usage data for the activity of motor vehicle transport is then received by the communication module 14, which usage data has been transmitted from the telematics tag 28 to the server 10.

In an alternative embodiment, the motor vehicle usage may be transmitted indirectly to the server 10 in which case the telematics tag 28 is connected to a different system that receives the data and in turn transmits the data to the server 10.

The identification of the telematics tag 28 is stored in the memory 12 and associated with the user identification so that they received motor vehicle usage data can be stored in the memory 12 and associated with the user identification.

Additionally, motor vehicle identification data is stored in the memory 12 and associated with the user identification. The motor vehicle identification data typically includes the type of motor vehicle, the age of the motor vehicle and the fuel type used by the motor vehicle.

The tag 28 is used to monitor a number of aspects of the use of the motor vehicle 30.

For example, the tag 28 monitors the speed at which the vehicle is travelling and can therefore calculate average speed and maximum and minimum speeds, for example.

Where the tag 28 includes GPS functionality, for example, the tag 28 is able to determine if speed limits on a particular road have been exceeded.

The tag 28 is also able to determine accelerating and braking habits of the driver either using the GPS functionality or by using an accelerometer or having one or more sensors connected to the vehicle 30 or to a deceleration detection device, for example.

The tag 28 is also typically able to detect the distance travelled and if the driver has driven the vehicle 30 for a long time period without a break.

In addition to the above, the tag 28 will have the ability to detect the driver's use of the vehicle including braking, indicating, cornering and accelerating to name a few examples. Thus, it could be determined when the vehicle 30 turns without indicating, for example.

The motor vehicle usage data will typically include one or more of distance driven, average speed to driven, acceleration data, braking data and geographical data.

In any event, the motor vehicle data from the tag 28 is transmitted to the server 10 over a communication network 22.

It will be appreciated that this could be accomplished in a number of ways. For example, the data could be transmitted via a communication network 22 as illustrated in the accompanying drawing. This communication network could be any suitable kind of communication network such as a mobile communication network, a wireless communication network, a satellite communication network or a combination of these to name but a few examples.

Alternatively, the tag 28 could be connected to another intermediate device which downloads the data and transmits the data via the communication network 22 to the server 10. One example of this could be connecting the device 22 to a USB port of a computer and downloading the data to the computer, which data is then transmitted over the Internet to the server 10.

In one example embodiment, the data is transmitted over a mobile phone network by first being transmitted to a mobile phone of a user and then being transmitted to the server 10 by the mobile phone.

An example of such a system is described in the applicant's South African Patent number 2014/07981, the contents of which are incorporated herein by reference.

It will be appreciated that the data could be transmitted at any suitable time to the server. For example, the data could be transmitted in real time or near real time or could be transmitted periodically such as daily, weekly or monthly to name a few examples.

Where the motor vehicle usage data is received from the user's mobile telephone 24, this is accomplished by an application executing on the processor 42 of the mobile telephone 24, illustrated in FIG. 3.

The application makes use of data received from the GPS module 48, accelerometer 50 and gyroscope 52.

Data received from the accelerometer 50 is used to determine when the mobile telephone 24 is located in a vehicle and is traveling.

Once it is detected via the accelerometer 50 that the vehicle is traveling, trip data is captured including distance travelled via the GPS module 48.

Included in the trip data is acceleration data and braking data measured by the accelerometer 50.

This data recorded forms part of the motor vehicle usage data referred to above that is transmitted to the server 10.

The data is either transmitted directly from the mobile telephone 24 to the server 10 or indirectly via an intermediate server, as mentioned above.

Once the server 10 receives the motor vehicle usage data it will analyse the data to determine the manner in which the motor vehicle has been driven for a past predetermined period and thereby to determine a value of greenhouse gas emissions. This will be described in more detail below.

Incentives are provided for driving better in terms of braking, acceleration, speeding and driving less. Driving behaviours that reduce emissions from fuel use will result in rewards being awarded to the user. Reduction in fuel consumption can be derived from less driving, as well from improved driving style.

Food consumption data is received at the server 10 for example from one or more of a point-of-sale system, from a financial institution system and extracted from received food purchase invoices of the user.

Where the food consumption data is obtained from a point-of-sale system, the server 10 is connected to the point-of-sale system 32. The food consumption data for the activity of food consumption is then received by the communication module 14, which data has been transmitted from the point-of-sale system 32 to the server 10.

It will be appreciated that the server 10 could either receive the data directly from an actual point of sale device or other part of the point of sale system 32.

In an alternative embodiment, the usage may be transmitted indirectly to the server 10 in which case the point-of-sale system 32 is connected to a different system that receives the data and in turn transmits the data to the server 10.

It will also be appreciated that a point-of-sale system at for example a shop captures data about what a user is purchasing, including food items purchased by the user.

This food consumption data can then be obtained either directly or indirectly from the point-of-sale system.

This can be achieved in a number of ways. For example, the food consumption data can be pushed from the point-of-sale system to the server 10 periodically. Alternatively, or in addition, the server 10 can access the point-of-sale system by way of an application programming interface (API).

In one example embodiment this data is obtained from a system operated by a financial institution and could be either a credit or debit card system or another form of banking system to name a few examples.

In this example the point-of-sale system transmits to the financial institution system detailed information around the user's purchases.

The detailed information around the user's purchases can be pushed from the financial institution system to the server 10 periodically. Alternatively, or in addition, the server 10 can access the financial institution system by way of an application programming interface (API).

Where the food consumption data is extracted from received food purchase invoices of the user, digital invoices of the user's food purchases are received at the server 10 via the communications module.

Software executing on the processor 16 parses these invoices to extract the required food consumption data.

The food consumption data will be stored in the memory 12 associated with a user identification for the relevant food consumption data.

Once the server 10 receives the data it will analyse the data to determine the food purchased by the user for a past predetermined period and thereby to determine a value of greenhouse gas emissions. This will be described in more detail below.

Users will also be encouraged to switch to food products that have a lower impact on the environment. Through a clearly marked food catalogue created in conjunction with grocer partners, users will receive additional discounts on items with a lower emissions footprint.

Flight usage data is received for example from one or more of an airline system 34, from the user's mobile telephone 24 or extracted from a received digital flight ticket received at server 10.

Where the flight usage data is obtained from an airline system 34, the server 10 is connected to the airline system 34 and obtains information about flights travelled by the user. The usage data for the activity of flights is then received by the communication module 14, which flight usage data has been transmitted from the airline system 34 to the server 10.

This can be achieved in a number of ways. For example, the flight usage data can be pushed from the airline system 34 to the server 10 periodically. Alternatively, or in addition, the server 10 can access the flight usage data from the airline system 34 by way of an application programming interface (API).

Where the flight usage data is obtained from the user's mobile telephone 24, this is accomplished by an application executing on the processor 42 of the mobile telephone 24, illustrated in FIG. 3.

The application makes use of data received from the GPS module 48 to determine that the user's location has changed by the distance in an amount of time which indicates the user has taken a flight. The difference in locations detected will indicate the distance travelled by air.

Where the flight usage data is obtained from a digital flight ticket of the user, a digital flight ticket of the user is received at the server 10 via the communications module.

Software executing on the processor 16 parses the flight ticket to extract the required flight usage data.

The flight usage data will typically include one or more of distance flown, number of flights taken and the class of travel, for example economy class or business class.

As described above, the server 10 will now have stored in the memory 12 data from two or more of electricity usage data, motor vehicle usage data, food consumption data and flight data.

This data will have been obtained from different sources and processed in different ways as described above.

Each of these different kinds of data now need to be further processed into a standard unit of measure which can be used to generate the user display which will be described in more detail below.

In one example embodiment, this is calculated as follows.

The standard unit of measure selected is Carbon Dioxide Equivalents (CO2e).

What will be described below is the processing of all four electricity usage data, motor vehicle usage data, food consumption data and flight data. However, it will be appreciated that in various embodiments two or more of these may be processed.

Software executing on processor 16 accesses the electricity usage data which includes a measure of kWh. In one example embodiment this is multiplied by a carbon coefficient to calculate a CO2e score.

The software executing on processor 16 accesses the flight data which includes a measure of distance flown and multiplies this by a carbon coefficient to calculate a CO2e score.

A higher carbon coefficient is used if a flight taken by the user was in a higher class. Thus distance traveled on flights taken by the user in business class will be multiplied by a higher carbon coefficient than distance traveled on flights taken by the user in economy class.

The software executing on processor 16 accesses the motor vehicle usage data as well as the motor vehicle data and uses the data to calculate a CO2e score.

In one example, this is implemented by multiplying the total fuel consumption for the user by the emissions per litre for that fuel type.

This is derived by extracting the distance travelled from the motor vehicle usage data and using this together with the type of vehicle to determine fuel consumption.

The type of vehicle used, and typically the geographical location of the vehicle, will determine the carbon coefficient to be used which will be multiplied by the fuel consumption to calculate a CO2e score.

If the user is part of a household, the total emissions per household is divided by the household member numbers to give the CO2 emissions per capita number.

For example, the following ratios are as used: an Adult is 50, a first child is 25, a second child makes the children 30 (so 15 per child), a third child makes the children 32.5 (so 32.5/3 per child), and each subsequent child adds 2.5 to the children contribution (equally divided per child).

So for example in a household with 2 adults and 2 children, each adult will be 50/(50+50+30)%=38.4% of the household, and each child will be 15/(50+50+30)%=11.5%.

If the user travels by public transport, the number of kilometres travelled are multiplied by a carbon coefficient determined by the method of transport.

The software executing on processor 16 accesses the food consumption data.

The software extracts the identification of food items purchased from the food consumption data. Stored in the memory 12 is a carbon coefficient value for each of the food items purchased and the software obtains this value from the memory 12.

The software multiplies the carbon coefficient value for each type of food by the amount of that food purchased and then the sums these to arrive at a CO2e score.

Where the system does not have a complete list of all food items purchased by a user, the system is able to calculate a value by determining the user's calorie requirements per day.

This is calculated by using a BMI index score for the user stored in the memory, together with activity data for the user stored in the memory.

Once the user's calorie requirements per day are known, the food items purchased by the user can be compared to the user's calorie requirements to determine what percentage of the total calorie requirements are included in the food items purchased.

For example, it could be determined that the items purchased only represent a third of the user's calorie requirements. In this example, the CO2e score calculated from the food items purchased will be multiplied by three to arrive at a more accurate CO2e score.

It will be appreciated that in the manner described above, the various forms of data received including two or more of electricity usage data, motor vehicle usage data, food consumption data and flight data are normalized to a standard value to be presented to the user as part of a display.

The Software executing on processor 16 combines all of the usage data from the plurality of activities for each user and generates a display data to be transmitted to a user device for display to the user on the user device.

Figure 5:
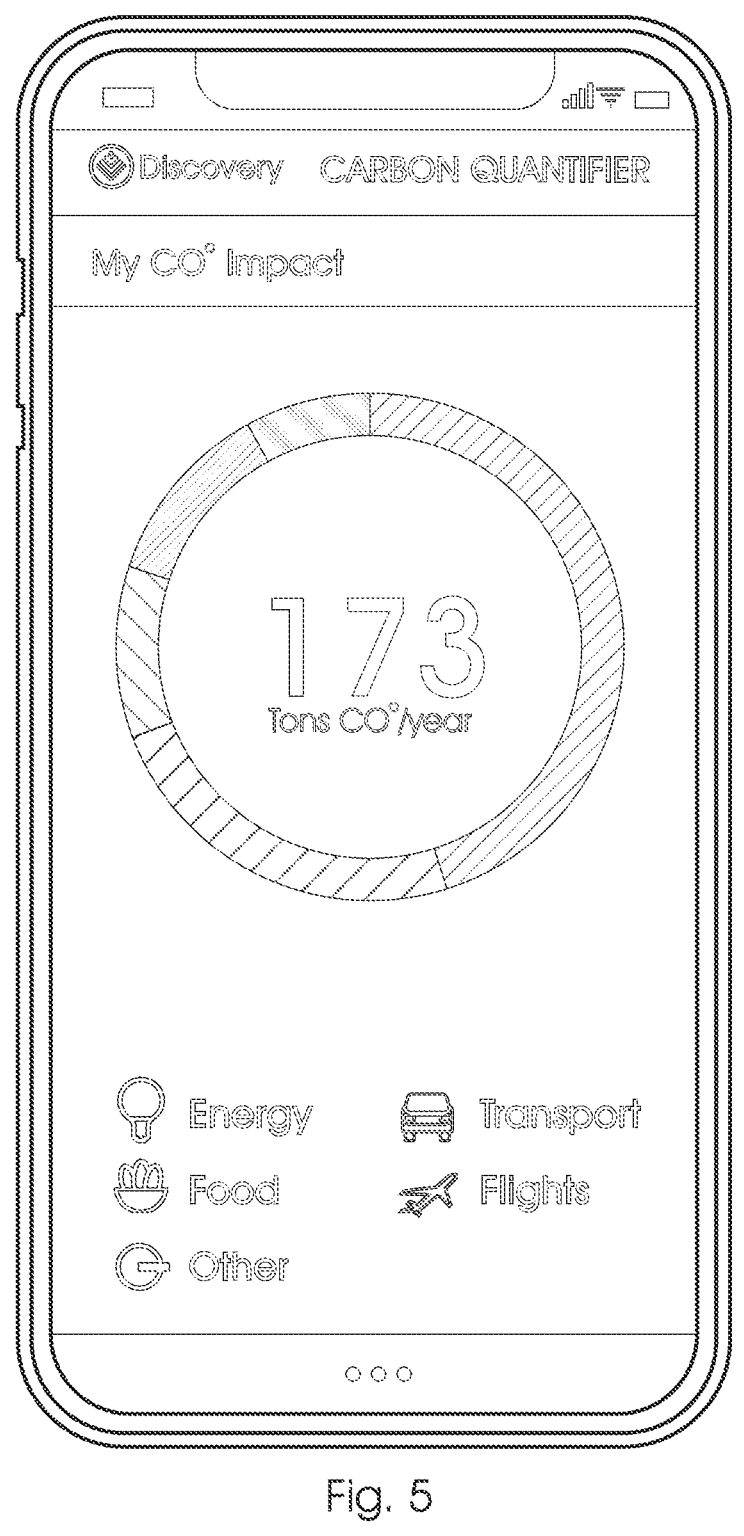

An example display is shown in FIG. 5. The display shows a user's total CO2e emissions. The different colours of the display relate to the different areas of measured CO2e emissions relating to energy, food, transport, flight and other.

To generate this display, the CO2e values for the two or more areas are sums to obtain a total. Once the total is obtained, it can be calculated what percentage of the total each of the two or more areas contributes.

The display can then be generated with a portion of a total circle being displayed sized relative to the area it represents.

Separate screens can be displayed to the user showing them total CO2e emission for a particular category as well as targets for the category, for example.

Other screens can also be included in the display. For example, a weekly CO2e target may be shown together with progress towards the target.

In one example the target is a total number of COe2 emissions used week to date which must be less than the displayed target. The total number of CO2e emissions used could be included in a count up towards the target or could be displayed as a starting number of CO2e counting down to zero which must be avoided.

Other information could also be displayed to the user including comparative information showing details of the average level of emissions from the same profile of person as the user.

The processor 16 is further programmed to analyse the usage data for each user to identify improvement areas where the user's activities could be improved to reduce the user's greenhouse gas emission.

For example, public and proprietary data can be used to establish the distribution of greenhouse gas emissions at the household or individual level of a particular demographic, across the different emission categories. Using this as a frame of reference, a client can be notified where their emissions could be improved, should they be an outlier for example. This is possible due to the nature of the greenhouse gas emission tracking mechanisms outlined above. There is also scope for granular insights to be provided, such as tracking the different sources of electricity used through the proprietary electricity meter, which could detect an abnormal electrical usage load emanating from the geyser (water boiler), say.

The identified improvement areas are then transmitted to the user device 24 for display to the user on the user device 24.

The communications module 14 also periodically receives further usage data relating to the plurality of activities that lead to greenhouse gas emission for each of the plurality of users and stores the further usage data in the memory 12.

The processor 16 is further programmed to analyse the stored usage data and further usage data and to calculate if the user has improved their activities to reduce their greenhouse gas emissions.

If the processor 16 calculates that the user has improved their activities to reduce their greenhouse gas emission, then the processor calculates a reward for the user.

Some examples of rewards are that the user can select the installation of a collection of electricity-reducing technologies such as geyser timers and LED lights, offered at a discount for being part of the programme.

For electricity usage, the user is able to track their consumption on a near real-time basis, and also given a weekly consumption goal. This goal is based on their historic consumption, adjusted for seasonality, and is expressed as a KWH allowance for the week.

The objective is to ensure it does not go to zero and if this is achieved, they will be provided with a reward. This reward could be a play on a rewards game where prizes are granted after playing the game. Alternatively, or in addition, the user can be awarded points which can be redeemed for prizes.

The user is also shown the direct savings they have made by changing their electricity consumption through this behaviour change and new technology.

Furthermore, should a user make a purchase of the electricity-reducing technology on an instalment basis, the interest due on the instalment can vary according to their goal achievement rate, or a status awarded to them based on their achieving certain goals in the programme.

Incentives are provided for driving better and driving less. The user will earn points toward a personalised weekly driving goal each day which is reduced by how the user drives during that day in terms of braking, acceleration, speeding etc. By not driving on a particular day, double the points will be awarded and by achieving a weekly goal, the user will be further rewarded Users are also encouraged to switch to food products that are not only healthy but have a lower impact on the environment. Through the clearly marked food catalogue at grocer partners, users will receive price discounts on items with a lower emissions footprint.

Users also have the ability to reduce their personal footprint to zero by purchasing credits using points they have earned on the programme.

As stated above, it has been found that 85% of an individual's greenhouse gas emissions relate to a small number of activities, namely their electricity consumption, their emissions from driving a private vehicle, emissions from all grocery purchases, as well as food consumed from external sources (canteens/restaurants) and emissions from flights travelled by the individual. In summary, these emissions come from the areas of electricity, transport, food and flying.

The system 10 aims to measure at least a plurality of these user activities, preferably all four of these user activities, and to provide the measured information back to the user via their user device.

The system 10 will monitor these activities over a period of time and store the data in the system memory 12. Once the system 10 has historical data, it is able to identify areas of potential improvement for the user and make suggestions to the user for how they could improve their activities to reduce their greenhouse gas emissions.

The system provides a rolling annualised measure of individual or household CO2e emissions, broken down by the relative contributions of each behaviour, as well as the ability to model the impact of different behaviour changes on emissions.

In one example, the user is rewarded for improving their activities and thereby reducing their greenhouse gas emissions.

Behaviour change enabled by the system will generate tradable carbon offset credits. Where the activities of the invention result in a reduction in CO2e emissions of a user compared to their baseline emissions (established at the beginning of the use of the invention), this qualifies as a unit of CO2e (measured in tonnes) removed from the atmosphere that can be traded on local or international markets to "offset" a tonne being emitted elsewhere.

The carbon credits generated by the programme (as it enables users to reduce their individual CO2e emissions) can be traded on carbon exchanges. The profits from these trades or sales are then re-invested in the programme to help fund the incentives that are used to encourage people to change their carbon-emitting behaviours.

Users will also be prompted via their mobile telephone 24 to complete assessments related to greenhouse gas emissions.

The user's will be provided with goals for specific periods, for example for every week, month or other suitable period.

These goals will be tracked and progress displayed to the users via the display 38.

As mentioned above, rewards will be given based on reaching of these goals and in one embodiment the reward will allow a user to spin a wheel-of-chance displayed on the display 38.

Additionally, the user will also be provided with recommendations to reduce their greenhouse gas emissions which will be displayed to them via the display 38. For example:

Switch from beef to chicken or vegetable based food this week.

Reduce your power consumption this week by 10 kWh.

Drive one day less this week.

What is claimed is:

1. A computer implemented system for measuring greenhouse gas emitting activities of a user, the system including:

a memory for storing data that lead to greenhouse gas emission;

a communications module for receiving data for each of a plurality of users relating to at least two greenhouse gas emitting activities of electricity usage data wherein the electricity usage data is received from one or more of a utility company, extracted from a received utility bill of the user, extracted from an email or website and received from an electricity usage measuring device installed at the user's residence;

motor vehicle usage data, wherein the motor vehicle usage data is received from one or more of a telematics tag connected to a motor vehicle driven by the user and from the user's mobile telephone;

food consumption data, wherein food consumption data is received from one or more of a point-of-sale system, extracted from an email or website from a financial institution system and extracted from a received food purchase invoices of the user; and flight usage data, wherein flight usage data is received from one or more of an airline system, from the user's mobile telephone, extracted from an email or website, or extracted from a received digital flight ticket;

a processor operably coupled to the memory and communications module, the processor programmed to:

access the memory and retrieve the data relating to the at least two of the greenhouse gas emitting activities;

convert the at least two of the greenhouse gas emitting activities data into normalized greenhouse gas emitting activities data using coefficients to localize the at least two greenhouse gas emitting activities data to a geographic region of the user;

calculate a Carbon Dioxide Equivalents (CO2e) value for the at least two of the normalized greenhouse gas emitting activities data; and use the calculated CO2e values to generate display data to be transmitted to a user device for display to the user on the user device, the display includes a representation of the calculated CO2e value for the at least two of the normalized greenhouse gas emitting activities data along with a calculated total value of each of the two normalized greenhouse emitting activities data.

2. A computer implemented system according to claim 1, wherein the processor is further programmed to analyse the usage data for each user to identify improvement areas where the user's activities could be improved to reduce the user's greenhouse gas emission.

3. A computer implemented system according to claim 2, wherein the identified improvement areas are transmitted to the user device for display to the user on the user device.

4. A computer implemented system according to claim 1, wherein the communications module periodically receives further usage data relating to the at least two of the greenhouse gas emitting activities that lead to greenhouse gas emission for each of the plurality of users and stores the further usage data in the memory, and wherein the processor is further programmed to analyse the stored usage data and further usage data and to calculate if the user has improved their activities to reduce their greenhouse gas emission.

5. A computer implemented system according to claim 4, wherein if the processor calculates that the user has improved their activities to reduce their greenhouse gas emission then the processor calculates a reward for the user.

6. A computer implemented system according to claim 1, wherein the processor is further programmed to apply weights to each of the at least two of the greenhouse gas emitting activities prior to the calculating the CO2e value.

7. A computer implemented system according to claim 1, wherein the processor is further programmed to overlay desired goals on the display including a representation of the calculated CO2e value for at least two of the electricity usage data, motor vehicle usage data, food consumption data and flight usage data.

8. A computer implemented system according to claim 1, wherein the representation of the calculated CO2e value is a circular graph of the calculated CO2e value for the at least two of the greenhouse gas emitting activities and each area of the circular graph corresponds to a percentage total of each of the two of the greenhouse emitting activities.

9. A computer implemented system according to claim 1, wherein the coefficients to localize the at least two of the greenhouse gas emitting activities to the geographic region of the user includes one or more of a type of electricity production, a geographic location of purchase of food, a geographic location for the purchase of fuel for the motor vehicle, or a combination thereof.

10. A computer implemented system according to claim 1, further comprising:

an electricity usage measuring device installed at the user's residence; and wherein the electricity usage data is received over a low power wide area network (LPWAN) from the electricity usage measuring device.

11. A computer implemented system according to claim 1, further comprising:

a telematic tag connected to a motor vehicle driven by the user;

an electricity usage measuring device installed at the user's residence;

wherein the motor vehicle usage data is received over a wireless communication network from the user's mobile telephone; and wherein the electricity usage data is received over a low power wide area network (LPWAN) from the electricity usage measuring device.

12. A computer implemented system according to claim 1, wherein the coefficients to localize the at least two of the greenhouse gas emitting activities to the geographic region of the user is based on the user's age.

13. A computer implemented method for measuring greenhouse gas emitting activities of a user, the computer implemented method comprising:

receiving data for each of a plurality of users relating to at least two greenhouse gas emitting activities of electricity usage data wherein the electricity usage data is received from one or more of a utility company, extracted from a received utility bill of the user, extracted from an email or website and received from an electricity usage measuring device installed at the user's residence;

motor vehicle usage data, wherein the motor vehicle usage data is received from one or more of a telematics tag connected to a motor vehicle driven by the user and from the user's mobile telephone;

food consumption data, wherein food consumption data is received from one or more of a point-of-sale system, extracted from an email or website from a financial institution system and extracted from a received food purchase invoices of the user; and flight usage data, wherein flight usage data is received from one or more of an airline system, from the user's mobile telephone, extracted from an email or website, or extracted from a received digital flight ticket;

converting the at least two of the greenhouse gas emitting activities data into normalized greenhouse gas emitting activities data using coefficients to localize the at least two greenhouse gas emitting activities data to a geographic region of the user;

processing the at least two of the normalized greenhouse gas emitting activities data data to calculate a Carbon Dioxide Equivalents (CO2e) value for at least two of the normalized greenhouse gas emitting activities data; and using the calculated CO2e values to generate display data to be transmitted to a user device for display to the user on the user device, the display including a representation of the calculated CO2e value for the at least two of the normalized greenhouse gas emitting activities data.

14. A computer implemented method according to claim 13, further comprising:

identifying improvement areas where the user's activities could be improved to reduce the user's greenhouse gas emission.

15. A computer implemented method according to claim 14, further comprising:

transmitting the identified improvement areas are transmitted to the user device for display to the user on the user device.

16. A computer implemented method according to claim 14, further comprising:

periodically receiving further usage data relating to the at least two of the greenhouse gas emitting activities that lead to greenhouse gas emission for each of the plurality of users and stores the further usage data, and analysing usage data and further usage data and to calculate if the user has improved their activities to reduce their greenhouse gas emission.

17. A computer implemented method according to claim 16, further comprising:

calculating a reward for the user based on determining that the user has improved their activities to reduce their greenhouse gas emission.

18. A computer implemented method according to claim 14, further comprising:

applying weights to each of the at least two of the normalized greenhouse gas emitting activities data prior to the process at least two of the normalized greenhouse gas emitting activities data to calculate the CO2e value, and wherein the weights are related to one of types of emission, time of emission, geography where the emission occurred, weather during the emission, and type of fuel used to create the emission, or a combination thereof.

19. A computer implemented method according to claim 14, further comprising:

overlaying desired goals on the display including a representation of the calculated CO2e value for the at least two of the normalized greenhouse gas emitting activities data.

* * * * *